(12) United States Patent
Kim

(10) Patent No.: US 9,769,881 B2
(45) Date of Patent: Sep. 19, 2017

(54) METHOD FOR MANUFACTURING SHEET-LIKE HEATING ELEMENT AND SHEET-LIKE HEATING ELEMENT MANUFACTURED BY THE METHOD

(71) Applicant: Sun Il Kim, Seongnam-si (KR)

(72) Inventor: Sun Il Kim, Seongnam-si (KR)

( * ) Notice: Subject to any disclaimer, the term of this patent is extended or adjusted under 35 U.S.C. 154(b) by 338 days.

(21) Appl. No.: 14/394,479

(22) PCT Filed: Apr. 9, 2013

(86) PCT No.: PCT/KR2013/002946
§ 371 (c)(1),
(2) Date: Oct. 15, 2014

(87) PCT Pub. No.: WO2013/157768
PCT Pub. Date: Oct. 24, 2013

(65) Prior Publication Data
US 2015/0076137 A1    Mar. 19, 2015

(30) Foreign Application Priority Data

Apr. 16, 2012  (KR) .................. 10-2012-0039221

(51) Int. Cl.
*H05B 3/14*  (2006.01)
*H05B 3/20*  (2006.01)
(Continued)

(52) U.S. Cl.
CPC ............ *H05B 3/145* (2013.01); *H05B 3/06*
(2013.01); *H05B 3/20* (2013.01); *H05B 3/84*
(2013.01);
(Continued)

(58) Field of Classification Search
CPC . H05B 3/145; H05B 3/06; H05B 3/20; H05B 3/84; H05B 3/14; H05B 2203/032;
(Continued)

(56) References Cited

U.S. PATENT DOCUMENTS 5,459,327 A * 10/1995 Nomura ................. H05B 3/145
250/495.1

FOREIGN PATENT DOCUMENTS

KR   10-0133009    12/1997
KR   10-0199636    6/1999
(Continued)

OTHER PUBLICATIONS

International Search Report Dated Jul. 9, 2013 from the Korean Intellectual Property Office Re. Application No. PCT/KR2013/002946 and Its Translation Into English.

*Primary Examiner* — Shawntina Fuqua

(57) ABSTRACT

According to a method for manufacturing a sheet-like heating element and a sheet-like heating element manufactured by the method of the present invention, cubics are pulverized into nanoparticles, the nanoparticle powder is mixed with carbon to become an original yarn, and the original yarn is cut to a length of between 0.2 mm and 0.8 mm and mixed into a pulp liquid to be formed into nanoparticle pulp. The sheet-like heating element forms a space where the particles can be rotated so as to allow 90% or higher far infrared radiation, and thus contributes to the health of users, entails a low defective rate since no bending occurs during the manufacturing, can be manufactured in quantity at low cost, and can be used for multiple purposes.

2 Claims, 3 Drawing Sheets

(51) Int. Cl.
  *H05B 3/06* (2006.01)
  *H05B 3/84* (2006.01)
  *B82Y 40/00* (2011.01)
  *B82Y 99/00* (2011.01)
  *B82Y 30/00* (2011.01)

(52) U.S. Cl.
  CPC ............. *B82Y 30/00* (2013.01); *B82Y 40/00* (2013.01); *B82Y 99/00* (2013.01); *H05B 2203/016* (2013.01); *H05B 2203/032* (2013.01); *H05B 2214/04* (2013.01); *Y10S 977/788* (2013.01); *Y10S 977/888* (2013.01); *Y10S 977/90* (2013.01); *Y10S 977/95* (2013.01); *Y10T 29/49083* (2015.01)

(58) Field of Classification Search
  CPC .......... H05B 2214/04; Y10T 29/49083; B82Y 30/00; B82Y 40/00; B82Y 99/00; Y10S 977/788; Y10S 977/888; Y10S 977/90; Y10S 977/95; B32B 29/00
  See application file for complete search history.

(56) References Cited

FOREIGN PATENT DOCUMENTS

| KR | 10-2004-0067495 | 7/2004 |
|----|-----------------|--------|
| KR | 10-2006-0005316 | 1/2006 |
| KR | 10-2008-0023714 | 3/2008 |
| KR | 10-2011-0110573 | 10/2011 |

* cited by examiner

[Fig. 1]
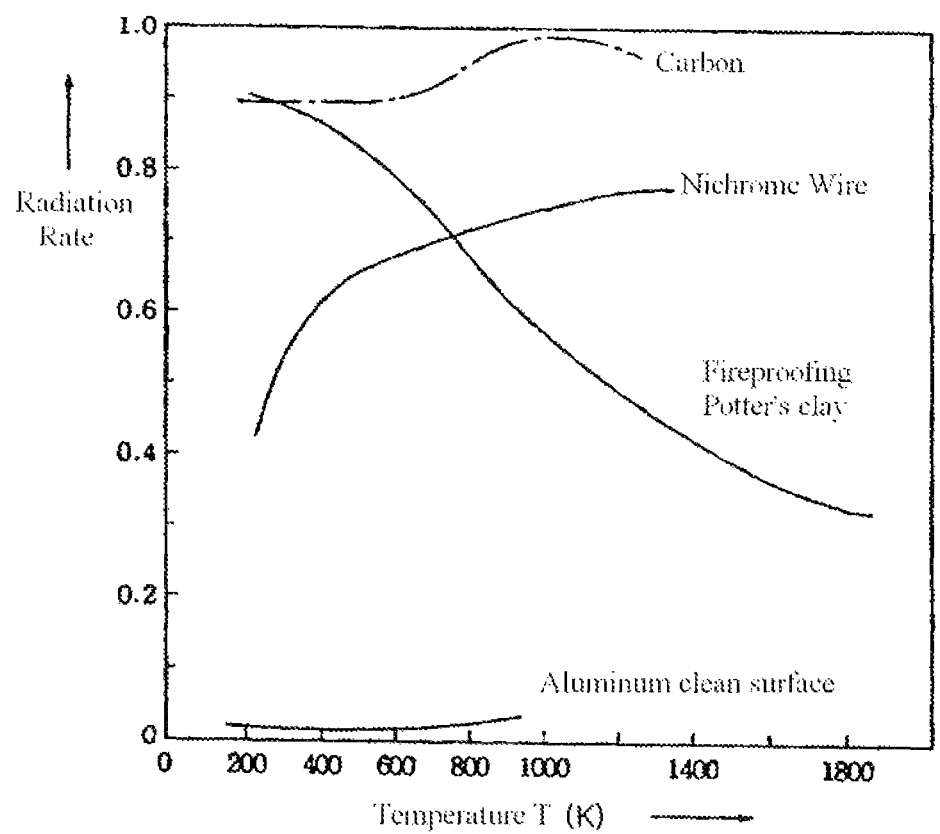

[Fig. 2]
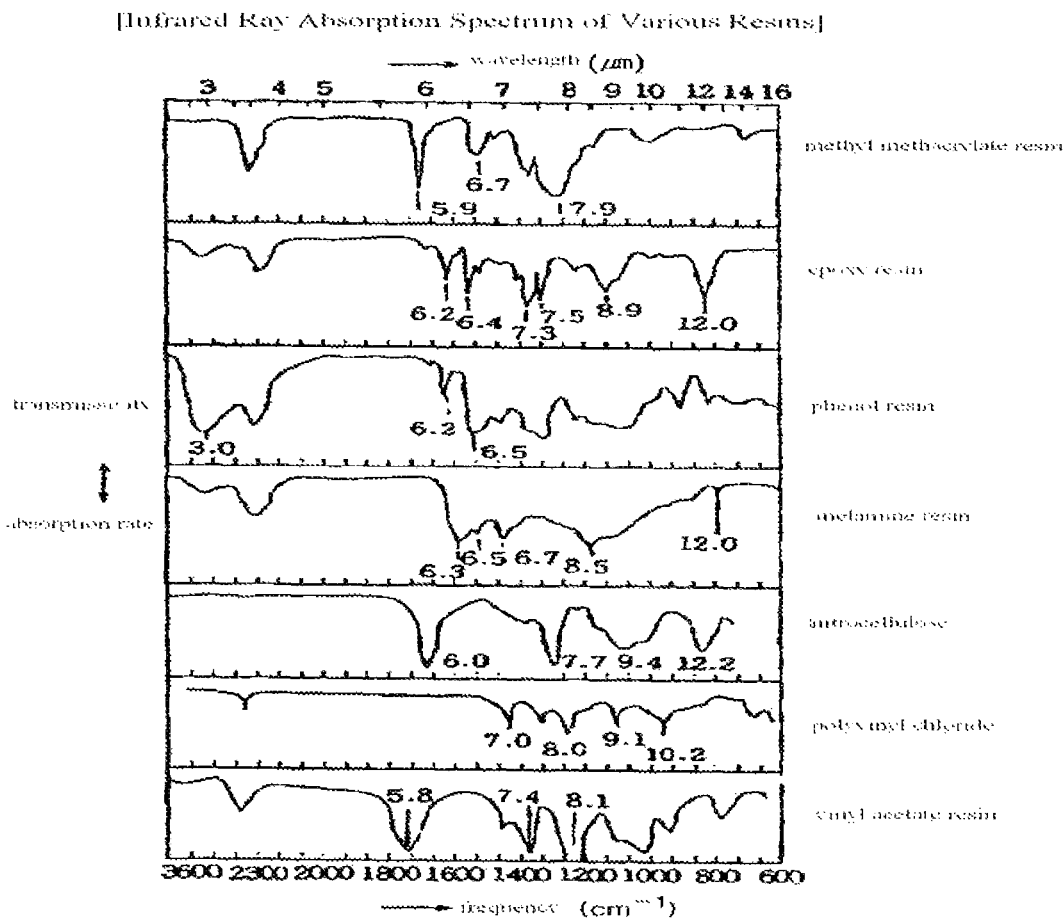
[Fig. 3]
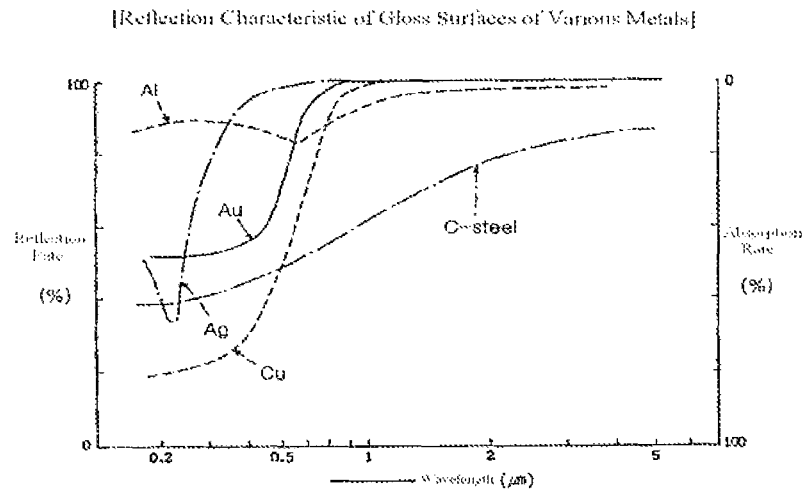

[Fig. 4]
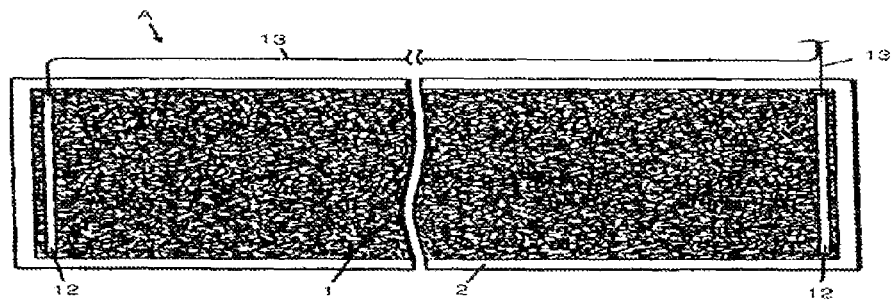
[Fig. 5]
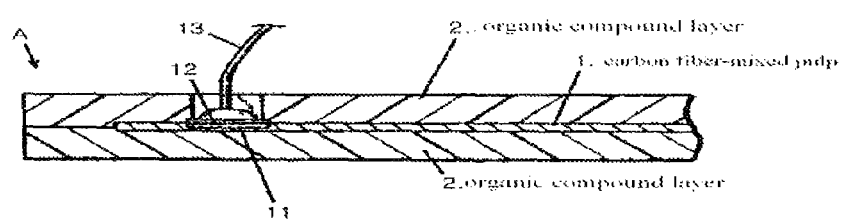
[Fig. 6]
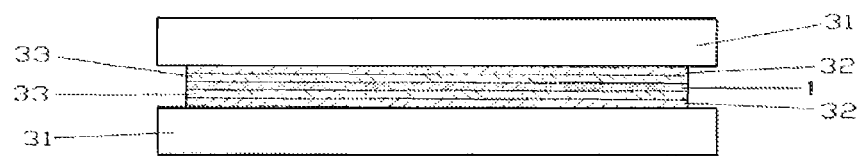

METHOD FOR MANUFACTURING SHEET-LIKE HEATING ELEMENT AND SHEET-LIKE HEATING ELEMENT MANUFACTURED BY THE METHOD

RELATED APPLICATIONS

This application is a National Phase of PCT Patent Application No. PCT/KR2013/002946 having International filing date of Apr. 9, 2013, which claims the benefit of priority of Korean Patent Application No. 10-2012-0039221 filed on Apr. 16, 2012. The contents of the above applications are all incorporated by reference as if fully set forth herein in their entirety.

TECHNICAL FIELD

The present invention relates to a method for manufacturing a sheet-like heating element and a sheet-like heating element manufactured by the method, and in particular to a method for manufacturing a sheet-like heating element, and a sheet-like heating element manufactured by the method which are characterized in that cubic or manmade diamond is pulverized into nanoparticles, and the nanoparticle powder is mixed with carbon to become an original yarn, and the original yarn is cut to a size of 0.2~0.8 mm, preferably, 0.5 mm and is mixed into pulp liquid to become nanoparticle pulp, and when the nanoparticle pulp is heated, the energy of the spinning electromagnetic waves formed around the carbon atoms of the nanoparticle powder increases, and the spinning electromagnetic waves escape from the surrounding of the toms and are discharged into a free space, and such spinning electromagnetic waves emit a far infrared ray with a low frequency, and the emission amount of the far infrared ray may be over 90%, and bending phenomenon does not occur.

BACKGROUND ART

A variety of heaters have been used for the sake of heating or warming. In particular, in recent years, a sheet-like heating element which uses carbon fiber attracts a lot of attention for the use as a heating element which radiates a far infrared ray. Concerning such as a carbon fiber sheet-like heating element, a variety of carbon fiber sheet-like heating elements are being proposed and used.

Such a carbon fiber sheet-like heating element is known to emit a far infrared ray. The far infrared ray is a kind of magnetic waves and has a wavelength of 8~16 μm which is most useful for a human body. When the far infrared ray is absorbed by the human body, it penetrates up to a deep skin layer (4~5 cm) which is 80 times deeper than common heat, thus causing oscillation with about 2,000 vibrations per minute which is very fine vibrations, thus enhancing the activity of cells. During the above cell activity procedures, heat energy is generated, and the temperature of the human body increases, and microvessel expands, and blood circulation becomes activated, so the thrombus in blood vessels melts, and the blood circulation is enhanced, and blood becomes clear, and ph is increased, and a function for changing a body constitution changes from acid constitution to weak alkali constitution is strengthened, and spiritual health is relaxed, and a stress which is a cause of adult diseases may be reduced. For this, there is a lot of efforts to use such a far infrared ray. As one example of such efforts, a carbon fiber sheet-like heating element may be regarded as such an effort.

In the carbon fiber sheet-like heating element, a carbon fiber is formed in a shape of sheets by means of a forming function substance, for example, a resin, etc. so as to stabilize the fiber structure. Since the carbon fiber sheet-like heating element emits a high temperature heat, it is not preferred to use a combustible substance like a resin, but it is inevitably used as a surface stabilizer which is capable of stabilizing the carbon fiber in a sheet-like form. As the above-mentioned surface stabilizer, a combustible resin is not used, and instead a resin with a heat resistance is selected. Since the main use of such a carbon fiber sheet-like heating element is heating or warming, a lot of developments are focused on its heating characteristic and electric characteristic.

For the carbon fiber sheet-like heating element, the research is focused on the aspect of heating performance; however no research on the aspect of the radiation of the far infrared ray element is being performed. Such a far infrared ray radiation element has been used for the sake of heat therapy. for this, it needs to selectively and efficiently radiate far infrared ray having a specific wavelength region based on the purpose of use.

Among such developments, there is the Korean patent registration number 10-199636 whose title is "far infrared radiation element and method for radiating far infrared ray" which has improved a lot of the problems; however the emission amount of the far infrared ray is small, and the organic compound layer is bent, which results in a lot of defective products.

DISCLOSURE OF INVENTION

Technical Problem

Accordingly, It is an object of the present invention to provide a sheet-like heating element which makes it possible to radiate far infrared ray with much higher efficiency, and the bending phenomenon of an organic compound layer may be prevented, and a high quality of products may be manufactured.

Solution to Problem

To achieve the above object, there is provided a method for manufacturing a sheet-like heating element, comprising pulverizing a cubic or a manmade diamond into a nanoparticle powder; preparing an original yarn having a diameter of 0.2~0.8 mm by mixing the nanoparticle powder with carbon; forming a nanoparticle pulp by cutting the original yarn to a size of 0.2~0.8 mm and mixing the cut original yarn into a pulp liquid; printing a silver paste on an edge portion of each of two opposite upper and lower sides of the nanoparticle pulp and attaching onto the silver paste an electrode made from a copper coated with a conductive adhesive; and hot-pressing an organic compound layer on the upper and lower sides of the nanoparticle pulp.

The above-described object of the present invention may be achieved by a sheet-like heating element manufactured by a method for manufacturing a sheet-like heating element of the present invention.

Advantageous Effects

The method for manufacturing a sheet-like heating element and a sheet-like heating element manufactured by the method are characterized in that cubic is pulverized into nanoparticles, and the nanoparticle powder is mixed with carbon to become an original yarn, and the original yarn is cut to a size of 0.2~0.8 mm and is mixed in a pulp liquid, and a space in which particles can spin is formed by means of a sheet-like heating element formed of nanoparticle pulp, so more than 90% of far infrared ray may be radiated, so a user's health may be enhanced while preventing the bending phenomenon during the manufacture. Defective rates are low, and a mass production is possible along with a low price. The present invention has an excellent effect because it may be used for multiple purposes.

BRIEF DESCRIPTION OF DRAWINGS

FIG. 1 is a view illustrating a temperature characteristic of an emissivity of various material.

FIG. 2 is a view illustrating an infrared ray absorption spectrum of various resins.

FIG. 3 is a view illustrating a reflection characteristic of various metallic gloss surfaces.

FIG. 4 is a plane view illustrating a sheet-like heating element according to a first exemplary embodiment of the present invention.

FIG. 5 is a vertical cross sectional view illustrating an end of a sheet-like heating element according to a first exemplary embodiment of the present invention.

FIG. 6 is a schematic vertical cross sectional view schematically illustrating a stacked state during a hot press of a sheet-like heating element according to a first exemplary embodiment of the present invention.

BEST MODES FOR CARRYING OUT THE INVENTION

FIG. 1 is a view illustrating a temperature characteristic of an emissivity of various materials. Referring to FIG. 1, carbon has the highest emissivity in a range from 300K(=27° C.) to 500K(227° C.).

In this case, the emissivity of the carbon is 0.9 which is in proximity to 1.0 of the emissivity of a black body.

Such a temperature range means that carbon is a substance which most efficiently radiate far infrared ray.

Concerning the selection of the far infrared ray of a specific wavelength range, an infrared ray absorption spectrum of an organic compound is considered, and the organic compound has a unique infrared ray absorption spectrum based on the natural frequency of the organic compound.

FIG. 2 is a view illustrating an example of the infrared ray absorption spectrum of various resins.

For example, a methyl methacrylate resin has an absorption peak of far infrared ray at a wavelength of 5.9 μm, 67 μm and 7.9 μm.

The epoxy resin has an absorption peak of far infrared ray at a wavelength of 6.2 μm, 6.4 μm, 7.3 μm, 7.5 μm, 8.9 μm, and 12.0 μm.

Every natural far infrared ray absorption peak appears based on the kinds of resins.

When the far infrared ray of the wavelength of the organic substance is absorbed, resonance occurs based on the state of molecule inside of the substance, so the far infrared ray of a specific wavelength region is selectively radiated to the outside.

More specifically, every substance has a function for radiating far infrared ray of a wavelength region depending on the wavelength having an absorption peak in the infrared ray absorption spectrum, so it is possible to select a desired wavelength of the far infrared ray by using various organic compounds as a filter.

For this, referring to FIG. 3, a metal such as aluminum, copper, silver and gold has about 100% of reflectivity in the wavelength region of the far infrared ray. So, such a metal cannot be used as a radiator of a far infrared ray.

Like this, in order to select a carbon fiber as a thing which most efficiently radiates a far infrared ray and select a far infrared ray of a specific wavelength, it may be considered to actively and efficiently use an organic compound. In addition, since a carbon fiber is linear, it may be considered that the radiation of a far infrared ray from the carbon fiber has a linear radiation. If the linear radiation is converted into a surface radiation, it may be considered that a radiation efficiency can be more enhanced. The physical and physiological reason why the wavelength of the far infrared ray is selected is that useful energy may be generated in such a way to molecule-resonate the far infrared ray based on the physiological structure and physical structure of the radiated substance.

The sheet-like heating element according to the present invention radiates a far infrared ray over the whole portions of the far infrared ray wavelength region using the heating element made from nanoparticle pulp containing the nanoparticles made by pulverizing cubic or manmade diamond, and the radiated far infrared ray is absorbed by the selected organic compound, and the far infrared ray of a predetermined wavelength region being dependent on the molecule state of the selected organic compound is resonance-radiated, thus maximizing the radiation amount of far infrared ray. Alternatively, the selected organic compound may be formed of one or multiple resin layers stacked on the nanoparticle pulp.

Another object of the present invention is directed to emit more than 90% of the emission of a far infrared ray in such a way that a far infrared ray is radiated over the whole portions of the far infrared ray wavelength region using a heating element made from a carbon fiber, and one or multiple kinds of organic compound layers are selected from multiple kinds of organic compound layers colored into a black color, and the radiated far infrared ray is absorbed by one or multiple kinds of the selected organic compound layers, and the far infrared ray of a predetermined wavelength region being dependent on the molecule state of one or multiple kinds of the organic compound layers are resonance-radiated onto the surface of the organic compound layer, and the linear radiation of the far infrared ray over the whole portions of the far infrared ray wavelength region is converted into the surface radiation of the far infrared ray of a predetermined wavelength region.

In the sheet-like heating element according to the present invention, the far infrared ray can be efficiently radiated over the whole portions of the far infrared ray wavelength region with the aid of the carbon fiber. At this time, since the carbon fiber is linear, the radiation of the far infrared ray from the carbon fiber becomes a linear radiation. In case that the nanoparticle pulp is colored into a black color, the far infrared ray linearly radiated from the carbon fiber may be efficiently absorbed by the whole portions of the nanoparticle pulp, so the far infrared ray may be radiated in a linear form from the surface of the nanoparticle pulp. Therefore, the group of the linear radiation of a far infrared ray may be fully converted into a surface radiation by means of the nanoparticle pulp of a black color, so the linear radiation of the carbon fiber may be fully converted into the surface heating. In particular, since the nanoparticle pulp is colored into a black color, the absorption efficiency of the far infrared ray is high, so the temperature increase rate of the nanoparticle pulp slightly increases with respect to the supply of electric power.

The far infrared ray radiated from the nanoparticle pulp is absorbed by a predetermined organic compound, and the absorbed far infrared ray is resonated with the molecule coupling of the organic compound, so the far infrared ray with a specific wavelength region is amplified and radiated from the organic compound, and the far infrared ray of the wider wavelength region absorbed by the organic compound is converted into a specific wavelength region and is intensified, so it is converted into a far infrared ray of a narrow wavelength region. In this case, since the energy of the wide wavelength region is intensified into a narrow wavelength region, the energy of the radiating far infrared ray may be greatly amplified as compared with the energy of every absorbed wavelength region.

In case that the organic compound layer is colored into a black color, the far infrared ray linearly radiated from the carbon fiber can be efficiently absorbed by the front side of the organic compound layer, and in this case, the absorbed far infrared ray is resonated with the molecule coupling of the organic compound layer, and the far infrared ray of a specific wavelength region is amplified and is radiated in a surface form from the surface of the organic compound, so the group of the linear radiation of the far infrared ray is fully converted into the surface radiation by means of the organic compound layer of the black color.

In this way, the linear radiation of the far infrared ray over the entire portions of the far infrared ray wavelength region is converted into the surface radiation of the far infrared ray of a specific wavelength region by means of the nanoparticle pulp of the black color or the organic compound layer of the black color. In addition, the temperature increase rate of the nanoparticles or the organic compound layer with respect to the supply of electric power slightly increases, by means of which the far infrared ray of the specific wavelength region may be radiated at a high radiation energy density, and a high radiation energy density may be obtained using a small consumption power, thus saving energy. In addition, since the temperature of the nanoparticle pulp slightly increases, the radiation energy of the long wavelength far infrared ray may be increased unless the wavelength of the radiated far infrared ray is moved toward the short wavelength.

The short wavelength far infrared ray warms the air, but the long wavelength far infrared ray does not warm the air but directly resonate $H_2O$ molecule and $CO_2$ molecule instead. So, the biological body can be directly heated or warmed by less consumption power, thus saving energy. According to the present invention, it is possible to radiate the far infrared ray of desired wavelength region at a temperature of 0 or lower than 0. It is very useful because heat can be provided to a specific thing without heating different environment molecule like air.

The sheet-like heating element "A" according to a first exemplary embodiment of the present invention comprises a nanoparticle pulp 1 prepared in such a way that cubic is pulverized into nanoparticles, and the nanoparticle powder is mixed with carbon to become an original yarn, and the original yarn is cut to a size of 0.2~0.8 mm, preferably, 0.5 mm and is mixed in a pulp liquid, and an organic compound layer 2 which is laminated on the surface of the nanoparticle pulp 1.

The reason why the cubic and manmade diamond are used in the present invention is that the diamond among the carbon components radiate the far infrared ray most, so the cubic or manmade diamond which has the physical property similar with the diamond is used. In addition to cubic or manmade diamond, nanoparticle powder or other mineral components similar thereto may be used.

For manufacturing the nanoparticle pulp 1, water is added to a bast fiber such as paper mulberry, paper-bush, wikstroemia trichotoma, etc., to make a pulp liquid, and the manmade diamond or cubic is pulverized to a size of nanoparticle, and the nanoparticle powder is mixed with carbon to become an original yarn whose diameter is 0.2~0.8 mm, preferably, 0.5 mm, and the nanoparticle fiber wherein the original yarn is cut to a size of 0.2~0.8 mm, preferably, 0.5 mm is mixed therein and is dispersed. The pulp liquid is spilled over the papermaking mesh, thus forming a wet sheet. The wet sheet is mechanically dehydrated using a dehydration roll and is dried and cut to a predetermined size, so the nanoparticle pulp 1 whose thickness is about 0.1 mm is manufactured.

When the nanoparticle pulp 1 wherein the nanoparticle powder is mixed is electrically conduced and heated using an electric heating wire, the spinning of the electrons which was spinning around the carbon particle during the heating becomes activated, so more than 90% of the far infrared ray can be emitted, thus increasing the radiation amount of the far infrared ray.

The nanoparticle powder formed of the nanoparticle powder forms an electromagnetic field with the aid of the electrons spinning around the atom, thus forming a spinning electron wavelength. When heating the nanoparticle powder, the spinning electromagnetic waves formed around the atom has increased energy and escape from around the atom, thus being emitting into a free space, and the spinning electromagnetic waves emit a far infrared ray having a low frequency, so it is possible to emit more than 90% of the radiation amount of a far infrared ray.

As a material of the organic compound layer 2, there is a thermosetting resin or a thermoplastic resin. As the thermosetting resin, there are phenol resin, melamine resin, furan resin, unsaturated polyester resin, diarylphthalate resin, epoxy resin, silicone resin, polyimide resin, urethane resin, etc. In addition, as the thermoplastic resin, there are polyvinyl chloride resein, vinyl acetate resin, vinylidene chloride resin, polystyrene, acryllonitrile-styrene resin, acryllonitrile-butadiene-styrene resin, methyl methacrylate resin, ethylene-acetic acid vinyl resin, polyamide, polyimide, polyamideimide, polyurethane, polycarbonate, polyester, nitrocellulose, etc. Like this, for the organic compound layer 2, as long as a predetermined substance has an absorption peak in the wavelength region of the far infrared ray, such a substance may be used for the purpose of the present invention after the peak is evaluated.

The material of the organic compound layer 2 may be selected based on the wavelength region of the far infrared ray which will be radiated. The material of the upper organic compound layer 2 and the material of the lower organic compound layer 2 don't need to be same, namely, different materials may be used.

In the present exemplary embodiment of the present invention, the method for manufacturing the sheet-like heating element "A" as illustrated in FIGS. 4 and 5 will be described assuming that the organic compound layer 2 is for example made from a glass fiber-reinforced epoxy resin (glass epoxy resin).

A band-shaped silver paste 11 is printed along two opposite sides of the nanoparticle pulp 1, and an electrode 12 made from a tape on which a copper containing a conductive adhesive is coated is attached to the silver paste 11. The black color nanoparticle pulp 1 is manufactured in such a way that a black color substance such as a black painting, etc., for example, CuO, $Fe_3O_4(Fe_3O_4$ or ferric oxide), $Fe_3P$, $Fe_2MgO_4$, $Fe(C_9H_7)_2$, etc. is coated on or impregnated into the nanoparticle pulp 1. In addition, the nanoparticle pulp may be colored into a black color before a pair of the electrodes 12 are attached to the nanoparticle pulp. In addition, the black color nanoparticle pulp 1 may be manufactured by mixing or dispersing the black color substance such as a black color paint into the pulp liquid during the manufacturing process of the nanoparticle pulp.

In addition, the glass epoxy resin is thermally hardened in such a way that the nanoparticle pulp 1 is inserted and hot-pressed in the half-dried glass epoxy resin layer. At this time, as illustrated in FIG. 4, in the region of the end of each electrode 12, a hole for the attachment of a lead wire may be formed at the glass epoxy resin layer.

The hot press work for thermally hardening the glass epoxy resin layer will be described. On a heating plate 31 such as a steel plate, a previously cut and prepared release film 32, a glass epoxy region plate 33, a nanoparticle pulp 1, a glass epoxy resin plate 33 and a release film 32 are arranged sequentially from the bottom, and then the heating plate 31 is arranged again. The thusly arranged structure is laminated to form multiple layers, preferably, to form about 10 layers, and the thusly laminated layers are arranged at the press.

In this state, the temperature of the press is increased up to 110~130° C., preferably, up to about 120° C. and is maintained for 17~23 minutes, preferably, for 20 minutes.

Thereafter, the temperature is increased up to 160~170° C., preferably, up to 165° C. while applying a pressure of 30 kg, and in a state that the temperature is increased to 165° C., the layers are maintained for 1 hour while applying a pressure of 100 kg.

Thereafter, the temperature is cooled down to the room temperature over 30~40 minutes, so a plurality of sheet-like heating elements "A" on which the organic compound layer 2 formed of a glass epoxy resin is laminated are produced at both sides of the black color nanoparticle pulp 1 in a state that the organic compound layer 2 does not have any bending phenomenon.

In this manner, the sheet-like heating element "A" whose thickness is 0.5 mm is manufactured in such a way that a lead wire 13 is connected by a welding method to an end to each electrode 12 on which the organic compound layer 2 made from a glass epoxy resin is laminated on both sides of the black color nanoparticle pulp 1.

When electric power is supplied through the lead wire 13 to the electrode 12 of the sheet-like heating element "A", current flows through the carbon fiber dispersed in the nanoparticle pulp 1, and the carbon fiber is heated and radiates a far infrared ray, and the spinning electron wavelength is formed because an electromagnetic field is formed by means of the electrons which are spinning around the atoms of the nanoparticle powder mixed in the carbon fiber, so when heating the nanoparticle powder, the energy of the spinning electromagnetic waves formed around the atom increases, and the spinning electromagnetic waves escape from around the atoms and are emitted into a free space. The spinning electromagnetic waves emit a far infrared ray of a low frequency, so the emission amount of the far infrared ray becomes over 90%.

In addition, when the organic compound layer 2 absorbs the far infrared ay of the infrared ray absorption peak wavelength, resonance occurs within the organic compound layer 2, so a far infrared ray of a specific wavelength region is selectively radiated to the outside. In other words, since the organic compound layer 2 has a function of converting the received heating energy into a far infrared ray of a specific wavelength region and radiating the far infrared ray, it is possible to efficiently radiate the far infrared ray of various wavelength regions depending on the wavelength of the infrared ray absorption peak of the organic compound.

As described above, in the sheet-like heating element "A" of the present exemplary embodiment of the present invention, the linear radiation of the far infrared ray from the carbon fiber is converted into a surface radiation by means of the black color nanoparticle pulp 1, the radiation efficiency of the far infrared ray is enhanced. So, the far infrared ray of the wavelength region being dependent on the kinds of the organic compound layer 2 can be radiated with a high efficiency (high energy density).

Each of the organic compound layers 2 may be overlapped with a plurality of kinds of organic compounds if necessary. In the example of FIG. 6, the organic compound layer 2 is formed of a laminated structure wherein three kinds of organic compound layers 2a, 2b and 2c are laminated.

In this case, the infrared ray absorption peaks of three kinds of the organic compound layers 2a, 2b and 2c are combined, and the far infrared ray of the wavelength corresponding to the combined infrared ray absorption peaks is selectively radiated.

INDUSTRIAL APPLICABILITY

The method for manufacturing a sheet-like heating element and a sheet-like heating element manufactured by the method according to the present invention is characterized in that the same method may be continuously performed in the manufacturing field of the sheet-like heating element, which means that the same product can be repeatedly manufactured, so the present invention has an industrial applicability.

What is claimed is:

1. A method for manufacturing a sheet-like heating element, comprising:
    pulverizing a cubic or a manmade diamond into a nanoparticle powder;
    preparing an original yarn having a diameter of 0.2~0.8 mm by mixing the nanoparticle powder with carbon;
    forming a nanoparticle pulp by cutting the original yarn to a size of 0.2~0.8 mm and mixing the cut original yarn into a pulp liquid;
    printing a silver paste on an edge portion of each of two opposite upper and lower sides of the nanoparticle pulp and attaching onto the silver paste an electrode made from a copper coated with a conductive adhesive; and
    hot-pressing an organic compound layer on the upper and lower sides of the nanoparticle pulp,
    wherein the hot-pressing step comprises:
        arranging, on a heating plate 31, from the lower side, a previously cut and prepared release film 32, a glass epoxy resin plate 33, a nanoparticle pulp 1, a glass epoxy resin plate 33 and a release film 32 and rearranging the heating plate 31 and laminating the above structure up to multiple layers;
        in this state, increasing the temperature of the press up to 110~130° C. and maintaining the state for 20 minutes;
        increasing the temperature up to 160~170° C. while pressurizing with a pressure of 30 kg and in the increased temperature state, the layers are maintained for one hour while applying a pressure of 100 kg; and cooling the temperature to the room temperature over 30~40 minutes,
wherein the nanoparticle pulp 1 is coated or impregnated to have a black color by selecting any of the compounds consisting of CuO, $Fe_3O_4$ ($Fe_3O_4$ or ferric oxide), $Fe_3P$, $Fe_2MgO_4$ and $Fe(C_9H_7)_2$.

2. A sheet-like heating element manufactured by the method of claim 1, comprising:
a nanoparticle pulp 1 prepared in such a way that a cubic is pulverized into nanoparticles, and the nanoparticles are mixed with carbon to become an original yarn, and the original yarn is cut to a size of 0.2~0.8 mm and is mixed into a pulp liquid; an
an organic compound layer 2 which is laminated on a surface of the nanoparticle pulp 1.

\* \* \* \* \*